(12) United States Patent
Solignac

(10) Patent No.: US 6,420,665 B1
(45) Date of Patent: Jul. 16, 2002

(54) METHOD FOR SAMPLING POWDERY PRODUCTS IN MEASURED AMOUNTS AND INSTALLATION COMPRISING SAME

(75) Inventor: Jean-Pierre Solignac, St. Mathieu de Treviers (FR)

(73) Assignee: Societe Roxane, S.A., Montpellier (FR)

( * ) Notice: Subject to any disclaimer, the term of this patent is extended or adjusted under 35 U.S.C. 154(b) by 0 days.

(21) Appl. No.: 09/367,447

(22) PCT Filed: Feb. 13, 1998

(86) PCT No.: PCT/FR98/00329

§ 371 (c)(1),
(2), (4) Date: Oct. 11, 1999

(87) PCT Pub. No.: WO98/35896

PCT Pub. Date: Aug. 20, 1998

(30) Foreign Application Priority Data

Feb. 13, 1997 (FR) .............................. 97 01796

(51) Int. Cl.⁷ .................. G01G 13/18; G01G 13/02; G01F 13/00
(52) U.S. Cl. .................. 177/105; 177/116; 177/119; 222/77; 222/229; 222/285
(58) Field of Search ................. 177/121, 120, 177/119, 116, 105, 108; 222/229, 410, 412, 230, 243, 282, 285, 287, 370, 77; 198/657, 662, 663, 670, 671, 672; 414/326; 366/193, 192, 229, 295, 320; 141/83

(56) References Cited

U.S. PATENT DOCUMENTS

| | | | | |
|---|---|---|---|---|
| 937,025 A | * | 10/1909 | Dickson | 366/295 X |
| 1,624,385 A | * | 4/1927 | Bergen | 366/192 X |
| 1,914,459 A | * | 6/1933 | Reider et al. | 366/192 X |
| 2,213,056 A | * | 8/1940 | Skoog et al. | 366/229 X |
| 2,858,011 A | | 10/1958 | Wahl | 222/413 |
| 4,077,527 A | | 3/1978 | Fryer | 414/325 |
| 4,205,919 A | * | 6/1980 | Attwell | 366/320 X |
| 4,861,216 A | * | 8/1989 | Fullemann et al. | 414/326 |
| 4,945,957 A | * | 8/1990 | Kardux et al. | 177/120 X |
| 5,524,796 A | * | 6/1996 | Hyer | 198/662 X |
| 6,123,445 A | * | 9/2000 | Grassi | 366/320 X |
| 6,244,388 B1 | * | 6/2001 | Yun | 198/671 |

FOREIGN PATENT DOCUMENTS

| | | |
|---|---|---|
| EP | 0 275 236 | 7/1988 |
| FR | 1 431 785 | 6/1966 |
| FR | 2 312 437 | 12/1976 |
| FR | 2 626 667 | 8/1989 |

OTHER PUBLICATIONS

Patent Abstracts of Japan, vol. 8, No. 54(M–282), Mar. 10, 1984 and Japanese Patent No. 58 207223, Dec. 2, 1983.

* cited by examiner

Primary Examiner—Randy W. Gibson
(74) Attorney, Agent, or Firm—Harrison & Egbert

(57) ABSTRACT

A device for metering dosed quantities of pulverulent products having a tank for storing the pulverulent products and a tubular duct extending to the tank. The tubular duct has a metering component for measuring the pulverulent product in the tank. The tubular duct serves to transport the product to a loading opening in the tank to a discharge opening. The outlet opening is combined with a blocking component that can be positioned on command between a blocking position and an open position.

25 Claims, 3 Drawing Sheets

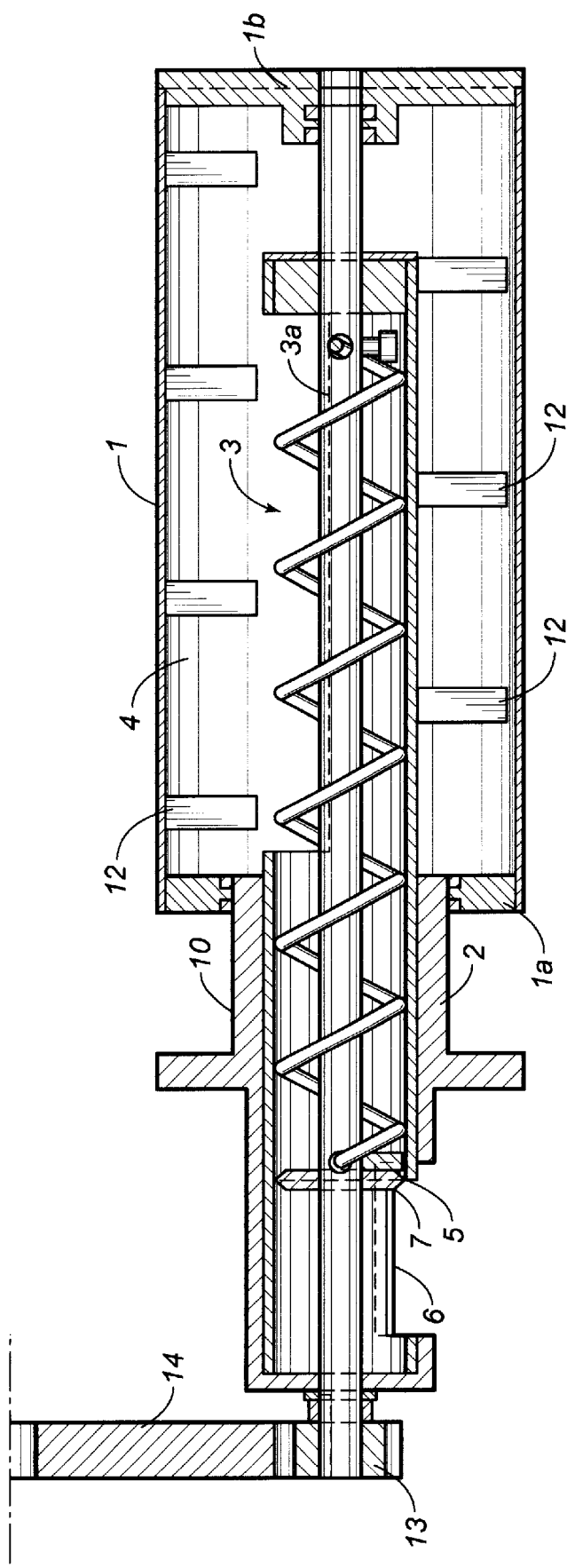
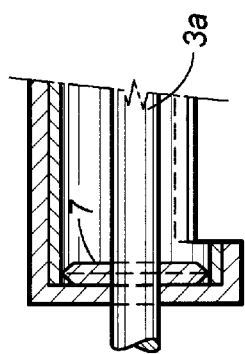
FIG. 4
FIG. 5

METHOD FOR SAMPLING POWDERY PRODUCTS IN MEASURED AMOUNTS AND INSTALLATION COMPRISING SAME

TECHNICAL FIELD

Divided products are understood to be ail types of products divided into particles, grains, crystals, etc., having a low or high granulometry. In the document presented here, the term "pulverulent" specifies this type of product.

The invention presented here involves a device that allows the automated metering of specified quantities of solid pulverulent products having very diverse physical characteristics. The metering of a powder in a specified quantity requires removing it from a storage container, transporting it until a discharge point, discharging it, generally into a container placed on a precision scales, and stopping the flow when the desired quantity has been reached. Depending on the physical characteristics of the powder to be metered, the difficulty of the operation remains especially in the extraction and the transport or in attaining the precision of the dosage at the end of the operation.

BACKGROUND ART

Known from the French invention patent number 94/09835, granted to the applicant, is a metering device for powder that implements, at the bottom of a container in which the powder to be metered is mixed by stirrers, a horizontal tube that adjoins the container, pierced at the bottom at one of its ends by an opening and in which is placed a loader driven in rotation, which consists of a shaft carrying a blade that forms a helical spring. This loader acts like an Archimedean screw, and its behavior in the case it becomes jammed encourages the backblowing of the horizontal tube.

Also known from the French patent application number 95/06081 in the name of the applicant is an additional device characterized essentially by the presence at the level of the outlet opening of the powder to be dosed. In the configuration described in this patent, the transporter shaft extends downstream from the opening and comes to enter into a bearing that is united with the structure of the device. According to this configuration, the disc always contains a pierced hole that passes through in the middle, by which it is mounted with the possibility for sliding on the downstream part of the shaft. The disc, the edge of which contains a chamfer relative to the shifting mechanism, is drawn towards the opening in order to completely block it, by a spring mounted around the downstream part of the shaft. This disc, under the pressure of the powder transported in the tube, is likely to become displaced on the downstream part of the screw, contrary to the action exerted by the spring. Thus, under the action of the pressure, the opening is more or less cleared and some of the powder can get out of the tube. This device makes it possible to create many small meterings, where the disc allows, when the flow rate oft he powder is low, only the flow of the finest grains. A particular embodiment mode of this device allows the mixing of the powder in the tank by means of a helical spring set in rotation above the screw or the shifting spring.

All of these devices have some disadvantages, however:
the extraction of powders from the storage tank is sometimes difficult, as a function of their physical characteristics: the mixing device can prove to be insufficient in certain cases.
the dimensioning of the spring connected to the blocking disc is difficult: thus, as a function of the physical characteristics of the powder, it can either limit the flow rate, or close the tube in an incomplete manner.

The invention presented here has the goal of correcting these disadvantages.

SUMMARY OF THE INVENTION

For this purpose, the device for metering pulverulent products in dosed quantities is essentially characterized in that it contains a tank for storage of the powder to be let out in dosed quantities, a tubular duct that reaches into the tank in the lower part of the tank, where the tubular duct accommodates on the inside a component for metering the pulverulent product in the tank and for transporting it from a loading opening that the duct makes in the tank to an opening for discharging the pulverulent product, which the duct has on the outside of the tank, where the discharge opening is combined with a blocking component that can be positioned upon command and kept either in a position of total unobstruction of the opening or in a position of blocking the opening by which an annular interval exists between the outline of the opening and the outline of the blocking component, the width of the annular interval being on the same order of magnitude as the size of each grain of the pulverulent product.

It is understandable that the position of total unobstruction allows a maximum flow rate of the pulverulent product across the outlet opening. On the other hand, the blocking position leads to a very low flow rate allowing a great precision in the quantity of the pulverulent product delivered. The low width of the annular interval between the outlet opening and the blocking component creates a sizeable head loss and largely slows down the flow of the product which becomes compressed behind and against the blocking component under the action of the pressure forces resulting from the movement of the transport component. These pressure forces have the effect of forcing the passage of a low quantity of product across the annular interval. The grains of a size slightly larger than the size of the interval either do not pass or are cut and divided during their passage. With these characteristics, experience shows that it is possible to obtain a precision in the dosage on the order of a milligram, which permits the use of this device for automatic and repeat dosage of pharmaceutical compositions and other compositions requiring high degrees of precision.

According to another characteristic of the invention, the metering and transport component consists of a shaft placed along a central longitudinal axis of the duct and of at least one pressure instrument affixed to the shaft and making several successive turns around the shaft, while the metering and transport component is mounted by its shaft so that it is mobile in rotation on two interdependent bearings at the ends of the duct, one of which is outside the tank and the other is inside, the metering component being driven in rotation upon command by its shaft, by a motor element around the central longitudinal geometric axis of the shaft.

This device has the advantage of simplicity and makes it possible, in controlling and adjusting the speed of the rotation of the metering component, to adjust the value of the flow rate of the discharged product. In addition, it is possible by driving the component in rotation in the opposite direction, to reduce the pulverulent product contained in the duct in the tank, and possibly avoid any interference flow of the product.

According to another characteristic of the invention, the blocking component is perpendicular to the geometric axis of rotation of the shaft and can be displaced in translation along the shaft and between the position of total unobstruction and the position of total blocking.

According to another characteristic of the invention, the blocking component is fixed in translation to the shaft and the shaft is mounted in a manner mobile in translation along the geometric axis of rotation in the translational guide bearings.

According to another characteristic of the invention, the shaft of the metering component, at the level of its bearing outside the tank, is extended beyond the tank in order to accommodate a component for coupling to a motor assembly for driving in rotation and translation. The advantage of these technical characteristics lies essentially in the fact that only one and the same motor assembly is used to activate the shaft in rotation and translation.

According to another characteristic of the invention, the metering device of the pulverulent products is equipped in the tank with a device for mixing and breaking up clumps of the pulverulent product.

This device prevents the aggregation of the product in the tank and ensures, consequently, the regular supply of pulverulent product to the metering and transport component. The invention presented here also has the object of a system for automatic dosage of pulverulent products characterized essentially in that it contains at least one device according to the invention.

According to another characteristic, the system is made up of several devices put together in at least one rectilinear or circular row, towards which is moved a motorized rotating meter element, carrying the motor assembly for setting into rotation and translation the shaft of the metering and transport component, as well as a weighing balance and a receiving container for pulverulent product installed on the weighing balance.

According to another characteristic, the motor assembly includes of an electric motor on the rotary output shaft of which is fixed, as much in translation as in rotation, a toothed wheel designed to be in mesh with the coupling component having a toothed pinion.

According to another characteristic, the motor assembly is provided with a horizontal mechanical plate mounted to slide on slide rails that are perpendicular or radial to the row of devices, and with a second motor for displacing the mechanical plate along the slide rails and to move the toothed wheel above the pinion or even to detach it from the pinion.

According to another characteristic, the toothed wheel is made in the shape of a circular sector and has a rectilinear clearance hole by which it is positioned above the pinion by displacement of the mechanical plate before being engaged with the pinion and the wheel is equipped on both sides of its toothed zone with two lateral sides in the shape of a circular sector, which by rotation of the wheel come to be located on both sides of the toothed pinion. Lastly, according to another characteristic, the rotating element of the meter carries a lower clamping jaw that is moved by an ascending movement for engagement and a descending movement for disengagement by an actuating drive. The lower jaw comes to end in a forked shape that comes at the end of the path of the ascending movement to be positioned behind the toothed pinion around the shaft. The sliding rails of the mechanical plate are mounted on an appropriate support mounted on the vertical sliding rails and set in motion in vertical translation by a motor element.

BRIEF DESCRIPTION OF THE DRAWINGS

Other advantages and characteristics of the invention appear in reading the description of a preferred embodiment form, given as a non restrictive example, in referring to the attached drawings in which:

FIG. 4 is a longitudinal section view of a device according to a second embodiment form, FIG. 5 is a detail view showing the blocking component in a position of total unobstruction.

DETAILED DESCRIPTION OF THE INVENTION

Figure 3:
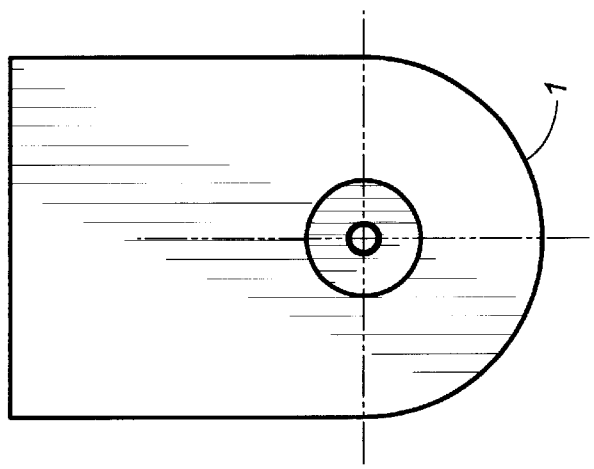
FIG. 3 is a front view of the device of FIG. 1.

As shown, the device, according to the invention, includes a storage tank 1 for pulverulent product to be discharged in a dosed quantity, a tubular rectilinear and horizontal duct 2, entering into the tank and occupying there by the part of it that is inside the tank, roughly the larger part of the length of the tank.

The tubular duct 2 has an internal cylindrical section and accommodates in this section a component 3 for metering the pulverulent product contained in the reservoir and for transporting this product from a loading opening 4 that has the duct 2 in the tank 1 to an outlet opening 5 of the pulverulent product, formed in the duct 2 outside of the tank 1.

According to the preferred embodiment form, the loading opening is formed by an aperture made in the wall of the tubular duct 2 and turned towards the top of the tank 1, in a manner to allow the gravitational flow of the pulverulent product from the tank 1 to the duct 2 and then towards the component for metering and transport 3. Preferably, the aperture is made on the larger part of the length, of the portion of the tubular duct 2 that is inside the tank.

According to this embodiment form, the outlet opening 5 is always made in the duct 2 immediately upstream from an evacuation opening 6 that the duct contains and is formed in the cylindrical wall of the duct. This evacuation opening is oriented towards the bottom in a manner such that the pulverulent product can flow under the influence of gravity, from the outlet opening to a container placed under the evacuation opening 6, for example on a weighing device not shown.

According to the preferred embodiment form, the component for metering and transport 3 is made up of a shaft 3a arranged along a central longitudinal axis of the duct 2 and by at least one pressure instrument 3b that is affixed to the shaft 3a and makes several successive turns around the shaft, the component for metering and transport 3 being mounted by its shaft 3a so that is mobile in rotation on two interdependent end bearings of the duct, of which one is outside the tank and the other inside the tank, where the metering component 3 can be driven by its shaft, upon command, in rotation by a motor assembly around the central longitudinal geometrical axis of the shaft 3a.

The bearings for guiding the shaft 3a are each mounted at the two ends of the tubular duct 2. Thus, the bearing outside the tank for guiding the shaft 3a of the metering component is mounted in the duct ahead of the evacuation aperture 6, while the bearing inside the tank for guiding the shaft is mounted behind the loading opening 4.

According to the invention, the metering device is equipped with a blocking component 7 combined with the outlet opening 5. This blocking component 7 can, upon command, be positioned and kept either in a position of total unobstruction of the opening 5 and in this position is located downstream from the opening 5 and the evacuation aperture 6, or in a position of blocking the opening 5 in which an annular interval exists between the opening 5 and the outline of the blocking component 7. The size of this annular interval is fitted to the size of the grains of the pulverulent product.

When the blocking component 7 is in the position of total unobstruction, there is nothing to oppose the outlet of the pulverulent product through the opening 5 and the opening 6. As a function of the shape of the component for metering and transport 3, the characteristics of the pulverulent product and the rotational speed of the component 3, the flow rate obtained can be very sizeable. The putting into position of the obstruction after a period of a large flow rate makes it possible to definitely stop the metering, and prevents uncontrolled fall of the pulverulent product during the final phase ensuring the precision of the metering.

In the blocking position, the blocking component 7 is located in the opening 5. A function of the shape of this blocking component 7, of the characteristics of the pulverulent product and of the rotational speed of the component 3, only very small quantities of the product will pass. Thus, a very low flow rate is obtained that makes it possible to obtain the required precision.

According to a preferred embodiment form, the blocking component 7 is perpendicular to the geometrical axis of rotation of the shaft 3a and can be moved in translation along the shaft between the position of total unobstruction to the blocking position.

Preferably, this blocking component 7, in the shape of a circular disc, is mounted on the shaft 3a of the component 3 and is fixed in translation and rotation to it. For this purpose, this disc 7 is provided with a central pierced hole that goes through it so it can be put onto the shaft 3a, and it is equipped with a radial tapped hole that opens into the central pierced hole in order to accommodate a screw for attaching the shaft 3a. It is understandable then that the blocking component 7 is driven in rotation with the component for metering and transport 3. Thus, in the blocking position, the rotation of the blocking component 7 will allow cutting and thus the division of grains of the size slightly greater than the size of the annular interval formed between the opening 5 and the blocking component 7. In order to reinforce this characteristic, the blocking component 7 has, along its perimeter, a raised edge that forms a continuous sharp edge.

The disc that forms the blocking component 7 can be made of a series of regularly spaced notches and a series of regularly spaced teeth, each tooth being arranged between two consecutive notches.

The size of each notch is fitted to the granulometry of the pulverulent product. The teeth formed also contribute to the cuffing and the division of the grains having larger sizes. The device for metering 3 is equipped, in the tank 1, with a device for mixing and breaking up clumps of the pulverulent product. By this mixing and breaking up clumps, an aeration of the product results which leads to a fluidization of it that can make its transport easier in the duct 2 to the opening 5.

According to a first embodiment form, the device for mixing and breaking up clumps is interdependent on the component for metering and transport.

Thus, during the rotation of the component 3, the pulverulent product is mixed and unpacked.

In the preferred form of the invention, the shaft 3a of the component for metering and transport is extended beyond its inside bearing in the tank and the device for mixing and breaking up clumps is affixed to the end of the shaft inside of the tank.

This device for mixing and breaking up clumps is coaxial to the component 3 for metering and transport and surrounds the part of the component 3 inside of the tank. In this manner, the device for mixing and breaking up clumps is driven in rotation in the tank by the component 3.

During its rotation, the pulverulent product is driven towards the top of the tank and is caused to fall back on the component for metering and transport 3.

The device for mixing and breaking up clumps has a profile 8 wound in spiral around the part of the duct 2 inside the tank. At one of its ends, this profile is attached to the shaft 3a.

To this device as described, a cutting disc can be attached that is mounted in rotation on the part of the tubular duct 2 that is inside the tank 1 and attached at the other end of the device for mixing and breaking up clumps 8. This cutting disc allows the rupture of the largest clumps that are likely to be formed in the tank and contributes to a reduction of the granulometry.

Figure 1:
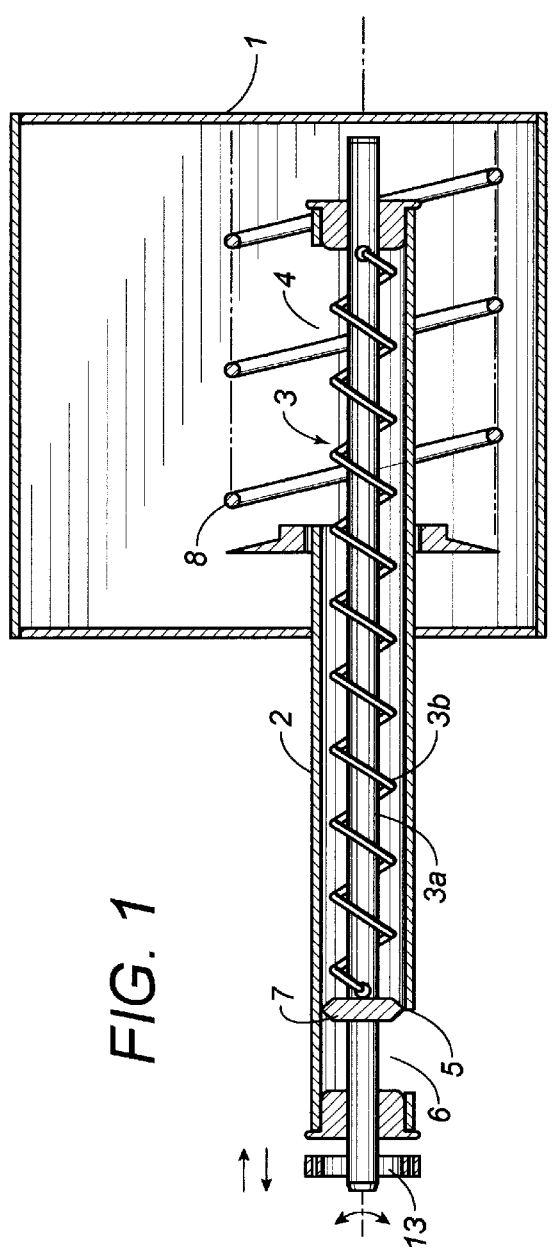
FIG. 1 is a longitudinal section view of a device according to a first embodiment form.
Figure 2:
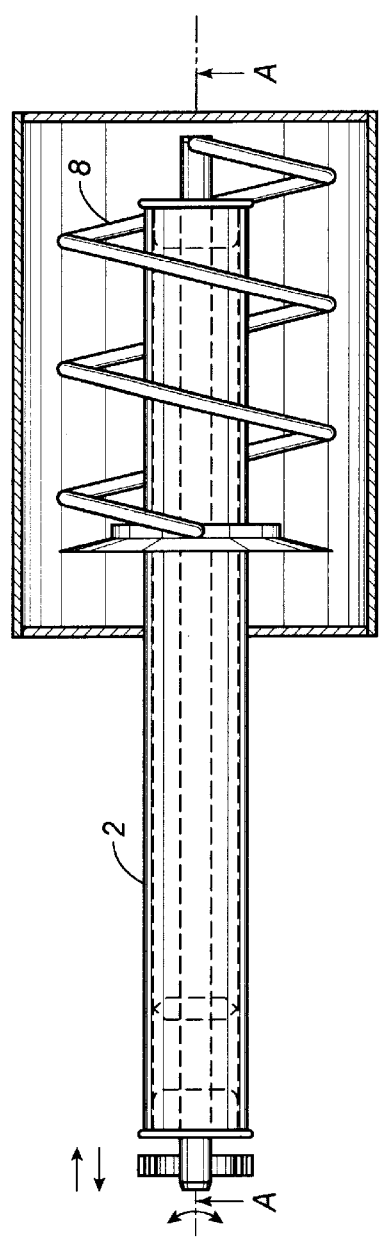
FIG. 2 is a view from above of the device according to FIG. 1.
Figure 6:
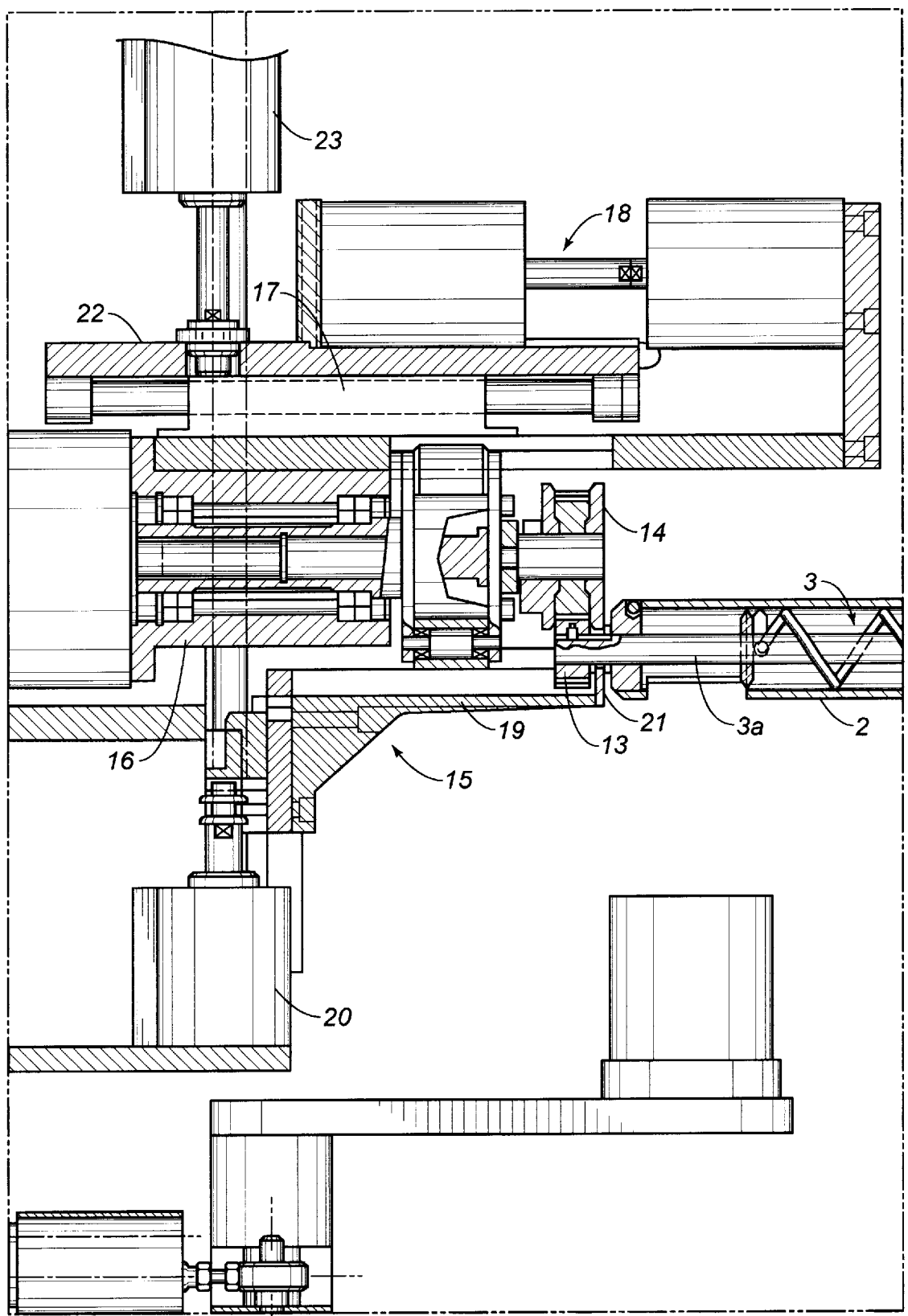
FIG. 6 is a section view of the motor drive assembly, according to a preferred form of the invention.

In the embodiment form, the subject of FIGS. 1 to 3, the tank is fixed while in the embodiment form that is the subject of FIG. 4, the tank can be moved and is driven in rotation by a motor assembly around the longitudinal geometric axis of the shaft 3a of the device for metering and transport.

Preferably, without being restrictive, the fixed tank 1 has a bottom in the shape of semi-cylindrical chute. Along the geometric axis of rotation of this chute, the part of the duct inside of the tank 2 and the part of the component for metering and transport 3 inside of the tank are installed.

A tank 1 that can be moved in rotation will be, preferably, in a cylindrical shape, the part of the duct 2 inside of the tank and the part of the device for metering and transport 3 inside of the tank being installed along the longitudinal center axis of the tank. This tank is thus formed from a cylindrical shell to which two laterally opposed walls 1a, 1b are attached.

This tank 1, as can be seen in FIG. 4, is mounted in rotation around the tube 2, the corresponding lateral wall 1a of the tank 1 being crossed straight through by a guidance bore by which the tank is mounted to rotate on a smooth cylindrical bearing 10 of the duct 2. According to this arrangement, the end inside of the tank, of the shaft 3a of the device for metering and transport 3, is fixed in rotation on the other lateral wall 1b of the tank 1 in a manner to transmit to the tank 1 its rotational movement. Preferably, the shaft 3a is also fixed in translation on the tank and thus transmits to the tank the translation movement by which it is active during the change of the position of the obstruction component 7.

For a tank that is mobile in rotation, the device for mixing and breaking up clumps includes a first series of blades 11 affixed to the wall of the tank 1 and extending in a radial manner towards the axis of rotation of the tank and second series of blades 12 affixed to the tubular duct 2 and extending, in a radial manner relative to the duct, towards the wall of the tank, the blades of the first series and the blades of the second series being longitudinally shifted relative to the axis of rotation of the tank in a manner to interpenetrate in the course of rotation and to cut the mass of the pulverulent product.

As previously stated, a coupling instrument 13 is connected to the shaft 3a of the component 3. The coupling instrument 13 is made of a toothed pinion 13 with which a toothed wheel 14 engages upon command in rotation, by a motor assembly described above.

This motor assembly can be interdependent on the device as described or even be carried by a motorized rotating meter element 15 that can be shifted along one or more lines, laid out in a circle or a straight line, of the devices according to the invention and can be positioned in turn facing some of them in order to remove from their tanks the quantity of powder required and to pour it into a container carried on a weighing balance installed on the rotating meter element and connected electrically to a driving and control assembly of the micro-computer type. This microcomputer has an information program that commands and controls as a function of these instructions and data of the program, the displacement of the rotating meter element 15, its position facing one of the devices and the operation of the corresponding dosing.

Thus, the program determines, as it goes along, the measure and the execution of the dosing required, the commands of rotation before or after as well as the axial positioning, as a function of the calibration established beforehand for each type of powder, as well as the information transmitted in return from the balance registering the weight of the quantities discharged.

This type of arrangement of mechanisms forms a system for automatic dosage of the pulverulent products.

The motor assembly can be made up of an electric motor 16 on the rotating output shaft of which the toothed wheel 14 is fixed as much in translation as in rotation. This motor assembly will be provided with a horizontal plate 17 mounted to slide on the sliding rails for example, horizontally, normally or radially to the row of devices, and with a second motor 18, of the pneumatic actuating drive type for example, in order to move the plate along its sliding rails and to bring the toothed wheel 14 above the pinion 13 or even to bring it out of the pinion. In the preferred embodiment form, the wheel 13 is made in the shape of a circular sector and has due to this fact a clearance that is preferably rectilinear. Thus, the wheel 14, by the displacement of the plate along the sliding rail, is brought by its clearance above the pinion 13. By the rotation, this wheel is brought into mesh with the toothed pinion 13 and transmits to it its rotational movement. In addition, the toothed wheel 14 is equipped on both sides of its toothed zone with two lateral sides in the form of circular sectors. In the course of the rotation, these lateral sides come to be arranged on both sides of the pinion 13 and thus allow the translational adjustment on the pinion 13. Thus, by displacement of the plate along the rotational axis of the shaft 3a, it is possible to position the obstruction element 7 in a position of total unobstruction or even in a blocking position.

The rotating meter element 15 can carry a lower clamping jaw 19 that is mobilized according to an ascending engagement movement and a descending disengagement movement by an actuating drive 20 that is pneumatic or of another type. This clamping jaw 19 will end in a forked shape 21 that comes to be positioned at the end of the path of the ascending movement behind the toothed pinion 13 around the shaft 3a. The sliding rails of the plate are mounted on a support 22 mounted to fit on the vertical sliding rails and mobilized in vertical translation by a motor element 23 of the pneumatic actuating drive type, for example. According to this embodiment form, the wheel 14 is no longer made in the shape of a circular sector, but in the form of a complete circle. This wheel always has two lateral sides. For the engaging of the wheel 14 with the pinion 13, the support 22 is first raised and the plate displaced towards the metering device in order to place the wheel 14 above the pinion 13. Then, the support is lowered so that the wheel 14 engages with the pinion 13.

The device that is the object of the invention can be used, according to its size, for industrial applications or for laboratory applications in all sectors of activity making very diverse compositions of products. At the same time, the device according to the invention can be used in a system for dosing containing the dosing devices for liquid products, as is described in the French patent invention no. 91/06705 granted to the applicant as well as in the patent applications FR 97/06436, FR 96/11004, and international PCT/FR97/01582 in the name of the applicant.

I claim:

1. A device for metering and dispensing dosed quantities of a pulverulent product, the device comprising:

a tank means for storing the pulverulent product;

a tubular duct extending into said tank means, said tubular duct having a loading opening within said tank means and a discharge opening exterior of said tank means;

a metering means interior of said tubular duct for metering the pulverulent product, said metering means for transporting the pulverulent product from said loading opening to said discharge opening; and a blocking means positioned at said discharge opening, said blocking means being selectively positionable between a first position of total unobstruction of said discharge opening and a second position generally blocking said discharge opening, said second position of said blocking means defining an annular interval between a periphery of said blocking means and an inner wall of said tubular duct at said discharge opening, said annular interval having a width generally equal to a size of grains of the pulverulent product, said blocking means in said first position for allowing a maximum flow rate of the pulverulent product therethrough, said blocking means in said second position for allowing a reduced flow rate of the pulverulent product through said discharge opening.

2. The device of claim 1, said metering means comprising:

a shaft extending along a central longitudinal axis of said tubular duct;

at least one pressure instrument affixed to said shaft and making several successive turns around said shaft;

a first bearing mounted within said tank means and rotatably receiving one end of said shaft;

a second bearing mounted exterior of said tank means and rotatably receiving an opposite end of said shaft; and a motor means drivingly connected to said shaft for rotating said shaft about said central longitudinal axis.

3. The device of claim 2, said blocking means extending radially outwardly of said central longitudinal axis of said shaft, said blocking means being translatable along said shaft between first and second position.

4. The device of claim 2, said blocking means being fixed in translation along said shaft, said shaft being mobile in translation between said first and second bearings.

5. The device of claim 4, said shaft extending outwardly of said tank, the device further comprising:

a coupling means connected to said meter means and to said shaft, said coupling means for driving said shaft in rotation and in translation.

6. The device of claim 1, said blocking means being a circular disc.

7. The device of claim 6, said circular disc having a raised edge that forms a continuous sharp edge along the periphery of said blocking means.

8. The device of claim 2, said loading opening being formed by an aperture in said inner wall of said tubular duct, said loading opening facing upwardly in said tank means such that the pulverulent product flows by gravity into said loading opening, said discharge opening being formed in said inner wall of said tubular duct immediately upstream from an evacuation opening in said tubular duct, said evacuation opening being oriented downwardly such that the pulverulent product can flow outwardly therefrom by force of gravity, the device further comprising:

a receiving container positioned below said evacuation opening.

9. The device of claim 8, said second bearing being mounted within said tubular duct downstream of said evacuation opening.

10. The device of claim 2, further comprising:

a mixing means positioned within said tank means, and mixing means for mixing and breaking up clumps of the pulverulent product.

11. The device of claim 10, said mixing means being cooperative with said metering means.

12. The device of claim 11, said shaft having said one end extending beyond said first bearing within said tank means, said mixing means being connected to said one end of said shaft.

13. The device of claim 12, said mixing means being co-axial with said metering means, said mixing means surrounding a portion of said tubular duct within said tank means.

14. The device of claim 13, said mixing means being a spiral member wound around said portion of said tubular duct.

15. The device of claim 1, said tank of claim 1, said tank means being rotatably driven by a motor around said metering means.

16. The device of claim 15, said tank means being rotatable mounted around said tubular duct, said tank means having a lateral wall with a guidance bore extending therethrough, said guidance bore mounted on a cylindrical bearing affixed to said tubular duct.

17. The device of claim 10, said mixing means comprising:

a first series of blades affixed to a wall of said tank means and extending inwardly therefrom toward an axis of rotation of said tank means; and a second series of blades affixed to said tubular duct and extending radially outwardly therefrom toward said wall of said tank means, the blades of said first series being longitudinally offset relative to the blades of said second series.

18. The device of claim 17, said metering means having a shaft with one end fixed in rotation to another lateral wall of said tank means so as to rotate said tank means.

19. The device of claim 18, said end of said shaft being fixed in translation on said another lateral wall of said tank means so as to transmit translational movement to said tank means.

20. The device of claim 1, said tank means having semi-cylindrical chute at a bottom thereof, said tubular duct and said metering means each having a portion installed within said chute.

21. The device of claim 1, said tank means having a cylindrical shape, said tubular duct and said metering means being installed along a longitudinal control axis of said tank means.

22. The device of claim 2, further comprising:

a weighting means for weighing the pulverulent product passed from said discharge opening; and a receiving container positioned on said weighing means.

23. The device of claim 22, said motor means comprising:

an electric motor having a rotary output shaft;

a toothed wheel affixed to said rotary output shaft; and a toothed pinion connected to said shaft and engaged with said toothed wheel.

24. The device of claim 23, said motor means further comprising:

a horizontal plate;

slide rails perpendicular to said shaft, and horizontal plate being slidably mounted on said slide rails; and another motor means connected to said plate for displacing said plate along said slide rails and to move said wheel above said pinion.

25. The device of claim 24, said toothed wheel having a shape of a circular sector, said toothed wheel having rectilinear hole by which said toothed wheel is positioned above said pinion by displacement of said plate by said another motor means, said toothed wheel having two lateral sides each in a circular sector shape.

* * * * *